Patented Jan. 12, 1954

2,666,033

UNITED STATES PATENT OFFICE 2,666,033

LITHIUM SOAP GREASE CONTAINING METHACRYLATE ESTER POLYMER FOR BEARING NOISE SUPPRESSION

John Perry Dilworth, Fishkill, William J. Finn, Pawling, and Oney P. Puryear, Fishkill, N. Y., assignors to The Texas Company, New York, N. Y., a corporation of Delaware No Drawing. Application April 11, 1951, Serial No. 220,538

8 Claims. (Cl. 252—42)

This invention relates to a lithium soap lubricating grease composition, and particularly to such a composition prepared with a synthetic lubricating base.

Lithium soap lubricating grease compositions have found substantial use in aircraft controls and for other purposes where operation over a wide temperature range, and particularly operation at extremely low temperatures is encountered. U. S. Patent No. 2,450,221, Ashburn, Barnett and Puryear is typical of a superior lithium base grease of this type prepared from a lithium soap of an hydroxy fatty acid or the glyceride thereof, such as hydrogenated castor oil, and containing as the major proportion of the liquid lubricating base an oil-soluble high molecular weight high-boiling liquid aliphatic dicarboxylic acid ester within the lubricating oil viscosity range and possessing lubricating properties. As disclosed therein, the lithium soap may be formed from a major proportion of the hydroxy fatty acid or glyceride thereof, and a minor proportion of a saturated non-hydroxy fatty acid, such as stearic acid. Such greases have exceptional shear and texture stability over a wide temperature range and excellent low temperature properties.

While the lithium soap greases of the aforesaid type have proved eminently satisfactory in service, some objection has been encountered in certain applications involving the lubrication of ball bearings operated at high speed due to the development of a high pitched metallic rattle or noise. This high pitched noise has been found to be characteristic of such lithium soap greases prepared with a synthetic lubricant base. On the other hand, lithium soap greases prepared with conventional mineral lubricating oil as the lubricant base, as well as certain other ball and roller bearing greases prepared from other metal soaps, develop merely a low pitched purr or hum in the lubrication of ball bearings operated at speeds above approximately 2000 R. P. M. Particularly, when a large number of the ball bearings are confined within a small or enclosed space, the high pitched metallic rattle has proved so objectionable as to cause ball bearing manufacturers to reject the grease even though other lubricating properties are superior.

One of the principal objects of the present invention is to provide a lithium soap grease formed from a synthetic lubricant base, and which is free from objectionable noise when employed for high speed ball bearing lubrication.

Another object of the present invention is to provide a lithium soap grease formed with a synthetic lubricant base which retains all the desirable properties of the previously known greases of this type, including shear and texture stability over a wide temperature range and excellent low temperature properties, and at the same time is effectively inhibited against objectionable noise development in high speed ball bearing lubrication.

In accordance with the present invention, the foregoing objects have been attained by incorporating in the lithium soap grease about 0.3–5% by weight of a polymerized methacrylate ester of the formula

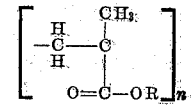

where R is a normal alkyl radical having 8 to 12 carbon atoms, and $n$ is a whole number sufficient to give the said polymer, when dissolved in 30% concentration in toluene, a kinematic viscosity at 100° F. within the range of 80–2,000 centistokes. In addition to the requirements of the methacrylate ester polymer of the particular chemical type specified, and of a molecular weight to provide the specified viscosity in toluene solution, it has also been found essential to incorporate the polymer during the process of grease manufacture following saponification and prior to heating the saponified mix to a temperature above 290° F. for a substantial period of time in excess of four hours, or prior to dehydration of the saponified soap mix.

Various methacrylate ester polymers have heretofore been suggested as additives for greases to inhibit oil bleeding and for other purposes. Commercially available polymers of this type are the so-called "Acryloids" manufactured and sold by Rohm and Haas. Polymers of this type which have heretofore been suggested are those recognized as pour depressants and viscosity index improvers for mineral lubricating oils, such as "Acryloid 150," which is primarily a cetyl methacrylate ester polymer and other Acryloids which are polymers of lower $C_1$ to $C_5$ alkyl esters of methacrylic acid. These commonly used polymers have been found ineffective for purposes of the present invention. In view thereof, it was not to be anticipated that a special class of methacrylate ester polymers, namely the $C_8$–$C_{12}$ esters, when polymerized to within a critical viscosity range, and when incorporated in the lithium soap grease prior to the dehydration thereof, would satisfactorily solve this new problem of bearing noise.

The present invention is applicable to lithium soap greases formed from any saturated fatty material, such as the conventional fatty acids or glycerides thereof, and which contain a synthetic lubricant base and would normally develop the high pitched metallic rattle in the lubrication of ball bearings operated at high speed.

Preferably, the lithium soap greases are formed from hydroxy fatty acids or their corresponding glycerides, such as hydrogenated castor oil, to obtain the improved shear and texture stability. Suitable types of soap-forming hydroxy fatty acids and glycerides thereof are disclosed in said Patent No. 2,450,221. While the soap-forming hydroxy fatty acids or their glycerides may be used as the sole acidic component of the lithium soap, they may be blended or combined with the conventional saturated fatty acids or fats in such proportion that at least 50% of the total acidic component is comprised of the hydroxy fatty acid or glyceride thereof. In general, any of the recognized fatty acid materials normally used in grease manufacture may be employed provided they are essentially saturated in character. These fats and fatty acids include mixtures of fatty acid glycerides found in naturally occurring fats and oils, together with fractionated components thereof. The fatty acids may be a mixture of acids split off from these fats or prepared from hydrogenation of vegetable or fish oils, or the individual acids themselves. Very satisfactory results are secured by employing as the saturated fatty material for the formation of the lithium soap a mixture of about 60–80% of hydrogenated castor oil or 12-hydroxy stearic acid with 40–20% of a saturated fatty acid such as stearic acid. The grease may contain about 10–25% by weight of the lithium soap.

In order to obtain the improved wide temperature range and low temperature properties, the liquid lubricating base of the lithium grease composition is formed of a major proportion of a synthetic oleaginous lubricating compound or condensation product, many types of which are now known in the art. Very satisfactory synthetic lubricants of this character are represented by the high molecular weight high boiling liquid aliphatic dicarboxylic acid esters which are within the lubricating oil viscosity range and possess lubricating properties. The compounds within this particular class are the esters of such acids, as sebacic, adipic, pimelic, azelaic, alkenyl succinic, alkyl maleic, etc. The esters thereof are preferably the aliphatic esters and particularly the branched chain aliphatic diesters. Specific examples of the preferred oleaginous compounds are di-2-ethyl hexyl sebacate, di-2-ethyl hexyl azelate, di-2-ethyl hexyl adipate, di-sec-amyl sebacate, di-2-ethyl hexyl alkenyl succinate, di-2-ethoxy sebacate, di-2-(2'-methoxy ethoxy) ethyl sebacate, di-2-(2'ethyl butoxy) ethyl sebacate, di-2-butoxy ethyl azelate, di-2-(2'-butoxy ethoxy) ethyl alkenyl succinate, etc.

These oleaginous compounds may be used as the sole component of the grease or they may be blended with a mineral lubricating oil. Where a blend is employed, and low temperature properties are required, the mineral lubricating oil is preferably a light refined distillate mineral lubricating oil, such as a naphthene or paraffin base distillate, having an SUS viscosity at 100° F. of about 50–130 and preferably about 100 seconds. The mineral lubricating oil will generally constitute less than 50% of the blend, and ordinarily about 40–20% thereof. The mineral lubricating oil blend is advantageous where the lithium soap is formed in situ. In such case the saponification of the fatty material with the lithium hydroxide and dehydration of the resulting soap are conveniently carried out in the presence of a portion of the mineral lubricating oil, and the synthetic lubricant together with the other additives, such as oxidation inhibitor, corrosion inhibitor, etc. employed in the grease are then added following dehydrations and as the agitated soap mix cools. As pointed out above, the methacrylate ester polymers of the present invention are incorporated in the required critical proportion following saponification and prior to dehydration at a temperature of about 290–330° F., and before the synthetic lubricant base is added. While the chemical reaction, if any, is not clearly understood, it is surmised that the heating of the polymer in the presence of the soap mix and a portion of the mineral lubricating oil may effect further polymerization thereof as well as intimate dispersion throughout the soap mix and lubricant base, which enables the resultant lithium grease composition to better retain a sufficiently thick adherent film on the balls and races of the bearing when operated at high speed, to thereby produce the satisfactory low pitched purr and avoid the objectionable high pitched rattle.

The following examples are given to illustrate the present invention.

*Example 1*

A lithium base grease was prepared from a fatty material consisting of about 75% by weight of hydrogenated castor oil and 25% by weight of stearic acid. The lubricating base used was a mixture of about 75% by weight of di-2-ethyl hexyl sebacate with about 25% by weight of a paraffin base mineral lubricating oil having an SUS viscosity at 100° F. of about 100. The method of preparation involved charging the steam-heated kettle with the hydrogenated castor oil in molten form together with a small proportion of the mineral lubricating oil, the latter being less than the amount of hydrogenated castor oil and generally about ½ to ⅔ the amount thereof. With the kettle contents thereof being stirred at a temperature of 175–200° F., a quantity of water which was less than the quantity of hydrogenated castor oil charged and generally about ½ to ⅔ thereof was added, and the lithium hydroxide in the form of a 10% aqueous solution was gradually introduced. Saponification was effected during a 4-hour period of stirring at a temperature of 180–200° F. The stearic acid was then introduced and stirring continued at the foregoing temperature for about 1 hour. At this point, the methacrylate ester polymer was introduced. The temperature was then raised as quickly as possible above 290° F., and preferably to about 320–330° F., and maintained at the elevated temperature for a period of about 5–9 hours for dehydration and until the soap base became translucent and had a tendency to fracture when cold. The remaining mineral lubricating oil was then introduced slowly as the temperature dropped to 300° F. The di-2-ethyl hexyl sebacate introduction was then begun and continued slowly over a period of about 8 hours as the temperature dropped to about 220° F. and the desired consistency was attained. A suitable oxidation inhibitor, such as phenyl-alpha-napthylamine, in a proportion of about 0.5% by weight on the grease was added with continued stirring, and the grease was finally drawn at a temperature of 180–190° F.

A series of greases were prepared in the foregoing manner, to each of which was added about 0.5% by weight of phenyl alphanaphthylamine, together with the various additives of the "Acryloid" type as shown in the following Table I. These various greases were then tested for noise rating in a test which has been developed for that purpose.

The test apparatus consisted of an ABEC #1 grade 204 ball bearing which could be slipped over a slightly tapered mandrel on the drive shaft of a 1/8 horse power 3450 R. P. M. electric motor equipped with plain bearings. The motor was fastened to a 1/4 inch steel plate which in turn rested on a cork base to provide a satisfactory noise and vibration-free assembly. A new bearing was used for each test. The bearings were bathed for a period of 4 hours in a 1:1 mixture of isopropyl alcohol-benzol, then flushed in cold benzol and dried. Each bearing was packed full of the test grease and then slipped onto the tapered mandrel until it gripped the latter, and was held in this position by pressing the edge of the outer race with both thumbs to produce a slight thrust load on the bearing. The outer race of the bearing was also rotated slowly in a direction counter to that of the rotating inner race, which forced the grease back into the bearing. The test was continued for 2½ minutes with the mandrel and inner race of the bearing rotating at 3450 R. P. M.; then the bearing was reversed on the mandrel so as to operate in the opposite direction for a second 2½ minute period. The intensity of the noise developed by the bearing was measured. An arbitrary classification of the noise level was established, using the low pitched purr of a satisfactory grease as the base line with a zero rating, and louder noise being graded from 1 to 4 or more as the noise level and pitch increased.

The following Table I shows the results obtained in this test on the greases prepared as described above:

TABLE I

| | Additive weight percent | Noise rating |
|---|---|---|
| 1. Base grease | | +3 |
| 2. Base grease | +4.7% "Acryloid 150" | +2 |
| 3. Base grease | +0.9% "Acryloid 150" | +2 |
| 4. Base grease | +0.9% "Acryloid HF 855" | +4 |
| 5. Base grease | +0.8% "Acryloid HF 880" | 0 |
| 6. Base grease | +5.3% "Acryloid HF 1300" | 0 |
| 7. Base grease | +2.0% "Acryloid HF 1300" | +1 |
| 8. Base grease | +1.0% "Acryloid HF 1300" | 0 |
| 9. Base grease | +0.8% "Acryloid HF 1300" | +3 |
| 10. Base grease | +0.4% "Acryloid HF 1300" | +3 |
| 11. Base grease | +1.1% "Acryloid HF 600" | 0 |

As shown in the foregoing table, the base grease without the methacrylate ester polymer gave a noise rating of 3, which represents an objectionable intensity. The "Acryloid 150" employed in Samples 2 and 3 represents the conventional type cetyl methacrylate polymer which is a well recognized pour depressant for mineral lubricating oils, and has heretofore been suggested as an oil bleeding inhibitor for greases. The "Acryloid 150" consists of approximately a 40% solution in lubricating oil of the active cetyl methacrylate polymer, the latter having a kinematic viscosity at 100° F. in 30% solution in toluene of approximately 150 centipoises. As shown by Sample 2, as much as 1.9% by weight of the active polymer of this type was ineffective to depress the noise level to a satisfactory intensity, since the rating of 2 represents an objectionable noise level. Sample 4 employed the commercial "Acryloid HF 855," which is a 40% solution in lubricating oil of a mixed methyl and ethyl methacrylate polymer, the latter having a kinematic viscosity at 100° F. in 30% toluene solution of about 55 centipoises. This is also representative of methacrylate ester polymers of conventional type which have heretofore been proposed and used as additives for lubricating oils and greases. As shown by the table this material of different chemical type was also completely ineffective for purposes of the present invention, since it enhanced the noise level.

Samples 5–11 inclusive of the table are representative of the particular chemical type of methacrylate ester polymers which have been found effective for purposes of the present invention. The "Acryloid HF 880" is primarily an octyl ester of methacrylic acid polymerized to the extent that the polymer in 30% toluene solution has a kinematic viscosity at 100° F. of about 80 centipoises. The "Acryloid HF 600" and "Acryloid HF 1300" are polymers of the same chemical type but of higher molecular weight, the former having a kinematic viscosity at 100° F. in 30% toluene solution of 600 centipoises and the latter of about 1300 centipoises. Each of these last three mentioned commercial materials is a lubricating oil concentrate having about 50% by weight of the active polymer. Consequently, from Sample 5 it is seen that as little as 0.4% by weight of this polymer was effective to reduce the noise rating of the grease to the satisfactory zero level. From Samples 9 and 10, it will be noted that proportions of 0.4% and 0.2% of the higher molecular weight polymer of this proper chemical type were not sufficient to reduce the noise rating. While the three "Acryloids" specified are generally composed of essentially the octyl ester, they may be formed of a $C_9$ to $C_{12}$-alkyl ester, or a mixture of two or more $C_8$ to $C_{12}$ normal alkyl esters of methacrylic acid. All materials of this type within the kinematic viscosity range specified have been found effective for purposes of the present invention, when employed in a proportion varying from about 0.3% by weight up to about 5%. A proportion of about 0.5% to 2.0% is generally preferred.

*Example 2*

A further series of greases of the precise composition described above in connection with Example 1 were prepared in the same manner, except that the method of blending the methacrylate ester polymer into the grease was varied. In those examples listed as "blended with finished grease" the polymer was added to the grease after the dehydration thereof had been completed and the temperature of the mix had dropped below about 220° F. The following Table II illustrates the results obtained in the foregoing noise rating test of these particular greases.

TABLE II

| | Method of incorporating "Acrylcid" | Noise rating |
|---|---|---|
| 1. Base grease+1.0% "Acryloid HF 600". | Blended with finished grease. | +3 |
| 2. Base grease+1.5% "Acryloid HF 600". | ----do---- | +3 |
| 3. Base grease+1.1% "Acryloid HF 600". | Added before dehydration | 0 |
| 4. Base grease+1.0% "Acryloid HF 1300". | Blended with finished grease. | +3 |
| 5. Base grease+1.0% "Acryloid HF 600". | Blended after dehydration but stirred 4 hours at 315° F. | +1 |

As shown from Samples 1, 2 and 4 of Table II, when the "Acryloid HF 600" or the "Acryloid HF 1300" was blended with the finished grease, no improvement in noise rating over the base grease was secured. On the other hand, as shown by Example 3, where the effective type of "Acryloid" was added before the dehydration step in the manufacture of the grease, a satisfactory zero noise rating was obtained. Sample 5 was prepared by blending the "Acryloid HF 600" with the base grease following dehydration, but in this case the conditions used for the blending step were similar to those employed during dehydration. Thus the material was blended by stirring with the grease at a temperature of 315° F. for 4 hours. As will be noted from the table, this procedure substantially improved the noise rating, but did not give quite as good results as blending before dehydration. As a result of a series of tests, it has been found that the polymer should be blended with the grease by heating therewith at an elevated temperature of about 290–330° F. and preferably 315–330° F. for a period of at least 4 hours; and best results are secured by blending the polymer with the soap mix prior to dehydration of the latter.

It will be understood that the grease may also contain other additives in minor amounts to impart special properties to the finished grease. For example, the grease may contain an extreme pressure or anti-wear additive, such as dibenzyl disulfide or tricresyl phosphate, in a proportion of about 1–3% by weight on the finished grease; a copper corrosion inhibitor, such as a basic alkaline earth metal sulfonate, in a proportion of about 1–2%; a material to improve the resistance of the grease to salt spray, such as sorbitan monoleate, in a proportion of 1–3%; as well as other types of amine oxidation inhibitors, dyes and the like.

Obviously many modifications and variations of the invention, as hereinbefore set forth, may be made without departing from the spirit and scope thereof, and therefore only such limitations should be imposed as are indicated in the appended claims.

We claim:

1. A lubricating grease for anti-friction bearings comprising essentially a lubricating base consisting of at least a major proportion of an oil-soluble high molecular weight high boiling liquid aliphatic dicarboxylic acid ester within the lubricating oil viscosity range and possessing lubricating properties, about 10–25% by weight based on the grease of a lithium soap of soap-forming fatty material containing at least 50% by weight on the basis of the fatty material of a hydroxy soap-forming material selected from the group consisting of 12-hydroxy stearic acid and hydrogenated castor oil, said soap thickening said lubricant base to a grease-like consistency suitable for ball and roller bearing lubrication, said grease being normally subject to producing a high pitched objectionable noise when employed for the lubrication of a ball bearing rotated at high speed, and about 0.3–5% by weight based on the grase of a polymerized n-alkyl ester of methacrylic acid wherein the said n-alkyl group contains from 8 to 12 carbon atoms, said polymerized ester in 30% solution in toluene having a kinematic viscosity at 100° F. within the range of 80–2000 centistokes and being incorporated in said grease by stirring at a temperature in excess of about 290° F. for a period of time effective to reduce said noise to a satisfactory intensity.

2. A lubricating grease according to claim 1, wherein said polymerized ester is essentially a normal octyl ester, and has a kinematic viscosity at 100° F. in 30% solution in toluene within the range of 500–1500 centistokes.

3. A lubricating grease according to claim 2, wherein said aliphatic dicarboxylic acid ester is a branched chain dialkyl ester of a saturated $C_6$ to $C_{10}$ dicarboxylic acid.

4. A lubricating grease according to claim 3, wherein said branched chain dialkyl ester is di-2-ethyl hexyl sebacate.

5. A lubricating grease for anti-friction bearings comprising essentially a lubricating base consisting of a major proportion of an oil-soluble high molecular weight high boiling liquid aliphatic dicarboxylic acid ester within the lubricating oil viscosity range and possessing lubricating properties and a minor proportion of mineral lubricating oil, about 10–25% by weight based on the grease of lithium soap consisting of in excess of 50% by weight based on the soap of lithium soap of hydrogenated castor oil and less than 50% of lithium soap of a saturated soap-forming non-hydroxy fatty acid, said soap thickening said lubricant base to a grease-like consistency suitable for ball and roller bearing lubrication, said grease being normally subject to producing a high pitched objectionable noise when employed for the lubrication of a ball bearing rotated at high speed, and about 0.3–5% by weight based on the grease of a polymerized methacrylate ester of the formula

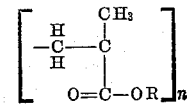

where R is a normal alkyl radical having 8 to 12 carbon atoms, and $n$ is a whole number sufficient to give the said polymer, when dissolved in 30% concentration in toluene, a kinematic viscosity at 100° F. within the range of 80–2000 centistokes, said polymer being incorporated in said grease by stirring at a temperature in excess of about 290° F. for a period of time effective to reduce said noise to a satisfactory intensity.

6. A lubricating grease according to claim 5, wherein said lubricant base consists of about a 3:1 weight ratio of di-2-ethyl hexyl sebacate to mineral lubricating oil distillate, said soap consists of about a 3:1 weight ratio of lithium soap of hydrogenated castor oil to lithium stearate, and said polymerized methacrylate ester is a normal octyl ester having a kinematic viscosity at 100° F. in 30% solution toluene within the range of 500–1500 centistokes.

7. In the manufacture of a lithium base ball and roller bearing grease which is normally subject to producing a high pitched objectionable noise when employed for the lubrication of a ball bearing rotated at high speed, wherein a soap-forming fatty material is saponified with a lithium base, the saponified product is then heated to a temperature in excess of 290° F. to effect dehydration, and the dehydrated product is then mixed with an oil-soluble high molecular weight high boiling aliphatic dicarboxylic acid ester within the lubricating oil viscosity range and possessing lubricating properties to form a grease of desired consistency as the dehydrated product cools, the method of reducing said noise level of the grease to a satisfactory intensity which comprises incorporating in the saponified product prior to said dehydration thereof about 0.3–5% by weight based on the finished grease of a polymerized methacrylate ester of the formula

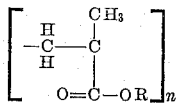

where R is a normal alkyl radical of 8 to 12 carbon atoms, and $n$ is an integer sufficient to give the said polymer, when dissolved in 30% concentration in toluene, a kinematic viscosity at 100° F. within the range of 80–2000 centistokes.

8. The method according to claim 7, wherein the soap-forming fatty material is a mixture consisting of more than 50% by weight based on the fatty material of hydrogenated castor oil and less than 50% of a saturated soap-forming higher fatty acid, and said dehydrating step is carried out at a temperature of 290–330° F.

JOHN PERRY DILWORTH.
WILLIAM J. FINN.
ONEY P. PURYEAR.

References Cited in the file of this patent
UNITED STATES PATENTS

| Number | Name | Date |
| --- | --- | --- |
| 2,020,714 | Wulff et al. | Nov. 12, 1935 |
| 2,091,627 | Bruson | Aug. 31, 1937 |
| 2,450,221 | Ashburn et al. | Sept. 28, 1948 |
| 2,451,895 | White | Oct. 19, 1948 |